(12) United States Patent
Castleman

(10) Patent No.: US 8,264,347 B2
(45) Date of Patent: Sep. 11, 2012

(54) SEAL SYSTEM IN SITU LIFETIME MEASUREMENT

(75) Inventor: Larry Castleman, Monroeville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 631 days.

(21) Appl. No.: 12/344,968

(22) Filed: Dec. 29, 2008

(65) Prior Publication Data

US 2009/0315267 A1     Dec. 24, 2009

Related U.S. Application Data

(63) Continuation-in-part of application No. 12/145,203, filed on Jun. 24, 2008, now abandoned.

(51) Int. Cl.
*G08B 21/00* (2006.01)
(52) U.S. Cl. ........... 340/540; 340/605; 340/606; 73/40; 73/49.2
(58) Field of Classification Search .......... 340/540, 340/870.17, 449, 454, 605, 606; 264/299, 264/328.1, 328.15, 478; 310/328, 338, 339, 310/340; 73/52, 40.7, 41, 49.5, 40, 49.2, 73/49.3
See application file for complete search history.

(56) References Cited

U.S. PATENT DOCUMENTS

| | | |
|---|---|---|
| 3,535,676 A | 10/1970 | Schultz, Sr. |
| 4,505,186 A | 3/1985 | Meier |
| 4,691,276 A | 9/1987 | Miller et al. |
| 4,691,928 A | 9/1987 | Abele |
| 4,932,673 A | 6/1990 | Domnikov |
| 5,041,989 A | 8/1991 | Kataoka et al. |
| 5,059,971 A | 10/1991 | Blaese |
| 5,090,871 A | 2/1992 | Story et al. |
| 5,118,118 A | 6/1992 | Tadic |
| 5,121,929 A | 6/1992 | Cobb |
| 5,214,241 A | 5/1993 | Benwell |
| 5,246,235 A | 9/1993 | Heinzen |
| 5,285,689 A | 2/1994 | Hapstack et al. |
| 5,345,829 A | 9/1994 | Yamauchi et al. |
| 5,431,413 A | 7/1995 | Hajzler |

(Continued)

FOREIGN PATENT DOCUMENTS

DE    102006060382 A1    6/2008

(Continued)

OTHER PUBLICATIONS

Communication dated Oct. 27, 2009 from European Patent Office including European Search Report (dated Oct. 12, 2009) and European Search Opinion for European Patent Application No. EP 09 00 8127.4 (5 pages).

(Continued)

*Primary Examiner* — Hung T. Nguyen
(74) *Attorney, Agent, or Firm* — Taylor IP, P.C.

(57) ABSTRACT

A sealing system for sealing between two members includes a polymer seal disposed between the two members, a measurement device, and an evaluation unit. The measurement device is at least partially disposed within the polymer seal, is configured for measuring an aspect of the polymer seal indicating sealing performance of the polymer seal, and is configured for creating a signal corresponding to a measured aspect of the polymer seal. The evaluation unit is configured for evaluating the signal corresponding to the measured aspect of the polymer seal and for determining a sealing performance capability of said polymer seal.

22 Claims, 5 Drawing Sheets

U.S. PATENT DOCUMENTS

| | | | |
|---|---|---|---|
| 5,524,908 | A | 6/1996 | Reis |
| 5,540,448 | A | 7/1996 | Heinzen |
| 5,701,119 | A | 12/1997 | Jurras, III |
| 5,702,111 | A | 12/1997 | Smith |
| 5,772,262 | A | 6/1998 | Dupont et al. |
| 5,796,349 | A | 8/1998 | Klein |
| 5,863,135 | A | 1/1999 | Bildtsén et al. |
| 5,865,971 | A | 2/1999 | Sunkara |
| 5,906,374 | A | 5/1999 | Arbuckle |
| 6,003,872 | A | 12/1999 | Nord |
| 6,065,345 | A | 5/2000 | Holenstein et al. |
| 6,082,941 | A | 7/2000 | Dupont et al. |
| 6,100,809 | A | 8/2000 | Novoselsky |
| 6,109,794 | A | 8/2000 | Bertetti et al. |
| 6,120,036 | A | 9/2000 | Kalsi et al. |
| 6,142,477 | A | 11/2000 | Meinzer |
| 6,331,823 | B1 | 12/2001 | El-Ibiary |
| 6,413,474 | B1 * | 7/2002 | Igel et al. ............... 422/82.05 |
| 6,446,208 | B1 | 9/2002 | Gujar et al. |
| 6,535,135 | B1 | 3/2003 | French et al. |
| 6,578,851 | B1 | 6/2003 | Bryant, III |
| 6,595,523 | B1 | 7/2003 | Heinzen |
| 6,615,639 | B1 | 9/2003 | Heinzen |
| 6,626,436 | B2 | 9/2003 | Pecht et al. |
| 6,637,754 | B1 | 10/2003 | Ohtsuki et al. |
| 6,685,012 | B2 * | 2/2004 | Bowden et al. ............ 206/213.1 |
| 6,763,703 | B2 | 7/2004 | Krieger et al. |
| 6,848,320 | B2 | 2/2005 | Miyajima |
| 6,857,638 | B2 | 2/2005 | Dupont et al. |
| 6,861,836 | B2 | 3/2005 | Sammataro et al. |
| 6,927,058 | B1 | 8/2005 | Dupont |
| 6,932,352 | B2 | 8/2005 | Matsumoto |
| 6,943,688 | B2 | 9/2005 | Chung et al. |
| 6,945,098 | B2 | 9/2005 | Olson |
| 7,014,368 | B2 | 3/2006 | Morita |
| 7,316,154 | B1 | 1/2008 | Bennett |
| 7,390,580 | B1 | 6/2008 | Dupont |
| 7,394,361 | B1 | 7/2008 | Twitchell, Jr. |
| 7,414,416 | B2 | 8/2008 | Watkins, Jr. |
| 7,434,986 | B2 * | 10/2008 | Ignatowicz ................... 374/4 |
| 7,568,516 | B2 | 8/2009 | Bergqvist et al. |
| 7,708,282 | B2 | 5/2010 | Veca et al. |
| 7,807,213 | B2 * | 10/2010 | Zhu et al. ................... 427/8 |
| 2004/0150169 | A1 | 8/2004 | Matsumoto et al. |
| 2004/0213319 | A1 | 10/2004 | Lancon et al. |
| 2005/0016303 | A1 | 1/2005 | Jacobs et al. |
| 2005/0156487 | A1 | 7/2005 | Tseng et al. |
| 2005/0247110 | A1 * | 11/2005 | Sagi et al. .................... 73/40 |
| 2007/0001809 | A1 | 1/2007 | Kodukula et al. |
| 2007/0008121 | A1 * | 1/2007 | Hart ......................... 340/540 |
| 2007/0108662 | A1 * | 5/2007 | Jenko ....................... 264/328.1 |
| 2007/0131035 | A1 | 6/2007 | Krutz |
| 2008/0000289 | A1 | 1/2008 | Furuse |
| 2008/0099998 | A1 | 5/2008 | Veca et al. |
| 2008/0138214 | A1 * | 6/2008 | Yajima ..................... 417/246 |
| 2008/0157477 | A1 | 7/2008 | Gaus et al. |
| 2009/0022941 | A1 * | 1/2009 | Fischer et al. ............. 428/116 |
| 2009/0236805 | A1 | 9/2009 | Dupont |
| 2010/0230901 | A1 | 9/2010 | Brooks et al. |

FOREIGN PATENT DOCUMENTS

| | | | |
|---|---|---|---|
| EP | 0 454 374 | A2 | 10/1991 |
| EP | 0 454 374 | A3 | 5/1992 |
| EP | 0495323 | A1 | 7/1992 |
| EP | 1 156 234 | A2 | 11/2001 |
| EP | 1156234 | B1 | 11/2001 |
| EP | 1818582 | A1 | 8/2007 |
| EP | 1 916 458 | A1 | 4/2008 |
| EP | 1916458 | B1 | 4/2008 |
| FR | 2660975 | A1 | 10/1991 |
| JP | 7-332502 | A | 12/1995 |
| JP | 11-294596 | A | 10/1999 |
| WO | 8602734 | A1 | 5/1986 |
| WO | 8706706 | A1 | 11/1987 |
| WO | 8904302 | A1 | 5/1989 |
| WO | 9005301 | A1 | 5/1990 |
| WO | 01/40756 | A2 | 6/2001 |
| WO | 01/40756 | A3 | 6/2001 |

OTHER PUBLICATIONS

Communication dated May 26, 2010 from European Patent Office for European Patent Application No. EP 09 00 8127.4 (1 page).

European Search Report dated Oct. 27, 2009.

Office Action dated Mar. 16, 2011 form Chinese Patent Office in Application No. 200910166940.7 (6 pages).

Communication dated May 26, 2010 from European Patent Office in Application No. EP 09008127.4-1252 (1 page).

Document entitled "Sanitary gasket product range" (12 pages) was published in the United States by Trelleborg before Dec. 29, 2008.

Document entitled "Food, Beverage and Pharmaceuticals Sealing Solutions" (32 pages) was published in the United States by Trelleborg before Dec. 29, 2008.

Document entitled "Rubber Fab Technologies Group's Smart Gasket Improved Pharmaceutical in Line Systems Validation"(4 pages) was published in the United States by Rubber Fab Technologies Group before Jun. 24, 2008.

Document entitled "Rubber Fab Technologies Group Hygienic Seal Material Guidelines" (4 pages) was published in the United States by Rubber Fab Technologies Group before Jun. 24, 2008.

Document entitled "Rubber Fab Technologies Group's Gauge Guard Isolator Hygienic Seals" (2 pages) was published in the United States by Rubber Fab Technologies Group before Jun. 24, 2008.

Communication dated Mar. 27, 2012 from the State Intellectual Property Office of the People's Republic of China for Application No. 200910166940.7 (12 pages).

* cited by examiner

SEAL SYSTEM IN SITU LIFETIME MEASUREMENT

CROSS REFERENCE TO RELATED APPLICATIONS

This is a continuation-in-part of U.S. patent application Ser. No. 12/145,203, entitled "SEAL ASSEMBLY IN SITU LIFETIME MEASUREMENT", filed Jun. 24, 2008, now abandoned which is incorporated herein by reference.

BACKGROUND OF THE INVENTION

1. Field of the Invention

The present invention relates to seal systems.

2. Description of the Related Art

It is known that at some times during use, seals and seal systems suffer a loss of sealing effectiveness. At times, in different applications, the loss of sealing performance leads only to a requirement for replacement of the seal. In other applications, loss of sealing performance can have effects ranging from a simple maintenance nuisance to an expensive resealing and cleaning operation, to even a potentially hazardous situation. It would be beneficial, if a seal or seal system could indicate prior to total failure, that the seal or seal system has lost some, but not all, performance, and that a replacement seal or seal system is to be required in the near future. Various seal and seal system combinations and applications could benefit from a function or feature of the seal that would indicate imminent loss of change of sealing performance, including o-ring type seals, face seals, labyrinth, rotary, dynamic and static type seals and others including elastomeric and polymeric composites, rubber, metal, fluoropolymers, or flurorocarbons, resins, and seals constructed from other constituents.

What is needed in the art is a seal system which provides a cost-effective way to measure the decay or change of sealing performance as a seal is being utilized in an application.

SUMMARY OF THE INVENTION

The present invention provides a seal system which provides a cost-effective way to measure the decay or change of sealing performance as a seal is being utilized in an application.

The invention in one form is directed to a sealing system for sealing between two members. The sealing system includes a polymer seal disposed between the two members, a measurement device, and an evaluation unit. The measurement device is at least partially disposed within the polymer seal, is configured for measuring an aspect of the polymer seal indicating sealing performance of the polymer seal, and is configured for creating a signal corresponding to a measured aspect of the polymer seal. The evaluation unit is configured for evaluating the signal corresponding to the measured aspect of the polymer seal and for determining a sealing performance capability of said polymer seal.

The invention in another form is directed to a sealing system for sealing between two members. The sealing system includes a data storage medium having polymer sealing performance criteria stored thereon; a processor in operative communication with the data storage medium; and a communication device for obtaining a sealing signal from a polymer seal, the communication device passing an obtained sealing signal to the processor, the data storage medium including file information specifying a plurality of threshold sealing signals, the processor comparing the obtained sealing signal to the plurality of threshold sealing signals and thereby computing an output signal based upon whether the obtained sealing signal is within bounds of the plurality of threshold sealing signals.

The invention in yet another form is directed to a method of sealing between two members. The method includes the steps of: providing a polymer seal at least partially disposed between the two members; measuring an aspect of the polymer seal indicating sealing performance of the polymer seal; creating a signal corresponding to a measured aspect of the polymer seal; evaluating the signal corresponding to the measured aspect of the polymer seal; and determining a sealing performance capability of the polymer seal.

An advantage of the present invention is that a seal assembly can measure a seal performance aspect of the seal itself.

Another advantage of the present invention is that it provides a seal assembly that, while in an installed condition, itself can be measured or sensed to determine the potential decay or change of sealing performance.

Yet another advantage is that it provides a seal or seal assembly having an embedded component or a continuous material composition that permits measurement of the decay or change of sealing performance as the seal is being utilized in an application.

Yet another advantage is that it provides way to determine when a seal has failed or is about to fail.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
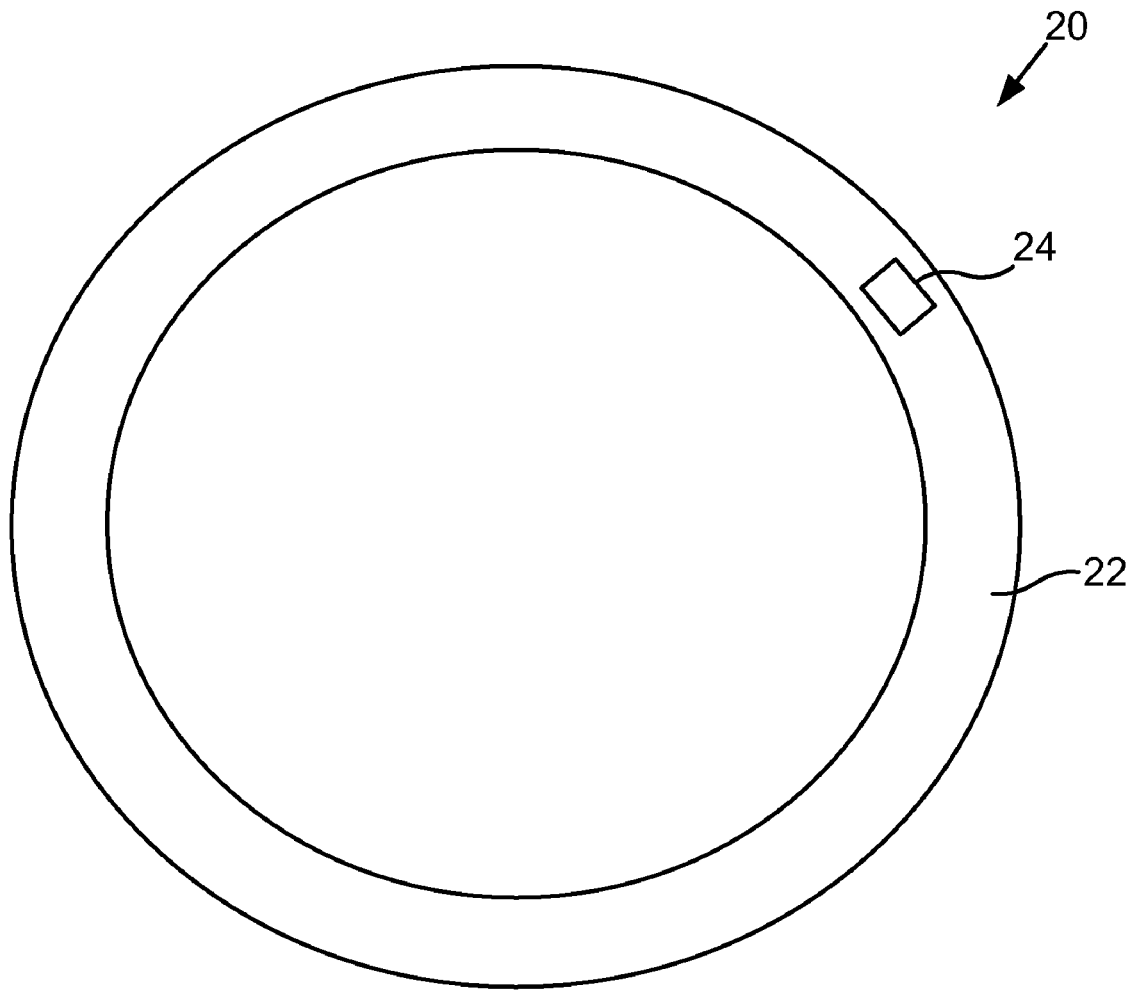
FIG. 1 is a schematic view of a seal assembly according to an embodiment of the present invention.

Referring now to the drawings, and more particularly to FIG. 1, there is shown a seal assembly 20 which generally includes a polymer seal 22 and an embedded sensor 24 that is to be used when the seal 22 is disposed within an application.

Such applications include, but are not necessarily limited to, static seals, rotary seals, piston-type seals, and rod-type seals. It is understood that seal assembly 20 is part of a larger sealing system which can include a plurality of seal assemblies, each of which can be, but need not necessarily be, substantially identical to seal assembly 20.

The sensor 24 to be utilized could be one that measures a particular aspect of the seal 22 or the seal system in the pressurized or un-pressurized state, as long as the seal 22 or the seal system is disposed within the environment in which it seals. Sensor 24 could be one selected from a group of known sensors for measuring temperature, pressure, fluid, acceleration, resistance, vibration, stress, strain, electrical current, radiation (including x-ray, microwave, electromagnetic spectrum), ultrasonic sensors, or other physical phenomena. These sensor devices 24 as just described and identified, would permit a signal in some form to be communicated outside the sealing environment, such that an indication of a change or loss of sealing performance which has occurred can be determined.

The sensor signals derived from this invention would have previously been cross compared with historical lifetime and historical time to failure data for the associated seal member 22 or seal system, to create lookup tables showing change of seal performance. Therefore, once a signal was received from a corresponding sensor 24, a lookup table operation, such as one that could be operated by a microprocessor or operator, would be utilized to determine the likelihood of seal decay or change in seal 22 performance or seal system performance. A memory, of a seal signal processor assembly, including performance data and/or thresholds regarding a plurality of polymer seals 22 or sealing assemblies 20 can be thus used. The historical performance data, as well as the thresholds, can be disposed in an Extensible Markup Language (XML) file or another way to match the signal of seal sensor 24 with predefined life indication. An example of a relevant threshold is a stress/strain threshold marking a limit such that if the actual stress/strain data falls below a specified limit (the threshold) then it is understood that seal 20 (such as polymer seal 22 itself) no longer provides sealing function (failure has occurred) or is about to lose its ability to provide sealing function. Another example of a relevant threshold is swell or absorption of fluid by seal 20 (such as polymer seal 22); this threshold provides a limit of fluid absorption such that if the fluid absorption rises above a specified level (the threshold) then it is understood that seal 20 (such as polymer seal 22 itself) no longer provides sealing function or is about to lose its ability to provide sealing function.

Various ways of signaling sensor output or creating a sensor output device would include an electrical, optical, or other signal, either wired, piped, or wirelessly communicated out of the sealing environment to a display or other control unit for communication to alert an operator to replace the seal 22 or seal system. A communication device for communicating the signal away from the polymer sealing is used. The communication device can be a radio-frequency identification (RFID) device. Thus, pursuant to FIG. 1, an individual sensor 24 can be inserted into the seal material 22 with a sensing capability that allows continuous or semi-continuous measuring, in an application, of the loss or change of sealing performance during the lifetime of the seal 22.

Figure 2:
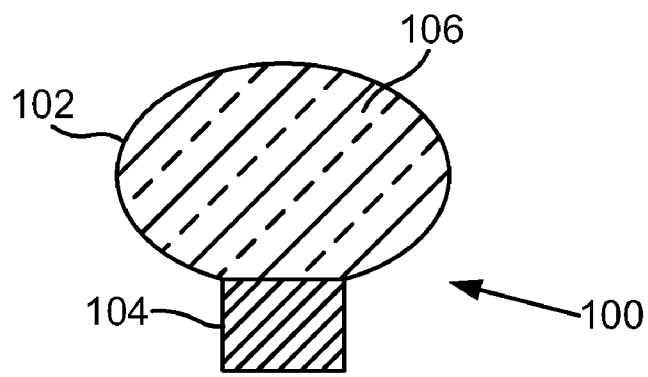
FIG. 2 is a cross-sectional view of a seal assembly according to another embodiment of the present invention.

Another form of the invention is shown in FIG. 2, which depicts a cross-section of a seal assembly 100 including a seal member 102 (which can be referred to as a seal ring) and a back-up member 104 (which can be referred to as a back-up ring). Seal 102 and back-up member 104 shown in FIG. 2 together form a ring (depending upon the sealing action to be accomplished by seal assembly 100, back-up member 104 can be positioned, for example, along the inner diameter or the outer diameter of seal assembly 100). Seal member 102 can include or be a rubbery elastomer; back-up member can include or be a polymeric, plastic, or metallic member. Seal member 102 is the seal portion of seal assembly 100 and can be a compression element which receives compressive forces when seal assembly 100 is disposed between two members. Back-up member 104 provides structural support to seal member 102 and helps seal 102 from extruding between gaps in the seal system (i.e., between the two elements between which seal assembly 100 provides sealing function). It is understood that seal assembly 100 is part of a larger sealing system which can include a plurality of seal assemblies; each of these seal assemblies can be substantially identical to seal assembly 100, or, alternatively, one or more of these seal assemblies can be substantially identical to seal assembly 20 while one or more of these seal assemblies can be substantially identical to seal assembly 100.

Seal member 102 further includes an embedded continuous material composition 106 that would give an indication of a change or loss of sealing ability of the seal 102 itself. Stated another way, seal element 102 includes an embedded material composition 106 that allows measurement of the decay in sealing performance of seal 102. For use in the present application, continuous material composition means that the embedded material 106 is embedded axially, radially, longitudinally, and/or latitudinally across, over, or through the seal member 102. Material 106 can be interspersed throughout the seal material of seal 102 such that material 106 is inherent as the seal material of seal 102 and thus forms at least part of the composition of seal 102. Thus, according to this embodiment of the present invention, sensing can be done throughout seal element 102.

In terms of construction methods, the material 106 may be embedded into the seal member 102 at the time of forming or molding, or associated with or on the seal member 102 after forming or molding. Such continuous material composition 106 may be utilized in addition to the embodiment of an embedded sensor 24 (discussed above), but in this case, the sensor 24 would measure a particular feature of the embedded continuous material composition 106.

Thus, the continuous material 106 is embedded in a seal member 102. The continuously embedded material composition 106 can have either an intrinsic or an extrinsic sensing capability that allows for continuous or semi-continuous monitoring of sealing performance or loss of sealing ability, or some form of degradation or change of the seal 102 and/or seal system. Regarding intrinsic sensing capability, material 106 can, for example, be used to detect or measure fluid within seal 102 (considering that seal material 102 can absorb fluid to an extent) and thus detect fluid where fluid should not have been absorbed by the seal material 102. Regarding extrinsic sensing capability, material 106 can be used to detect something other than seal performance of seal 102; for instance 106 can possibly be used to detect stress/strain in order to correlate that data to whether seal 100 (or seal 102 itself) has failed or is about to fail.

Various types of measurement could be accomplished on the embedded continuous material 106, that cross-compares to changes in the seal 100 performance (such as seal element 102 itself) or the seal system performance. For example, the use and changes of conductive fillers as an embedded material 106 shows promise in predicting and measuring seal performance. In this example, the changes of embedded material's electrical resistance over time for test seals or seal systems are measured, and loaded and formed into a historical lookup table construct and compared to selected measured seal lifetime and performance measures, with the comparison relationships recorded. Then, during actual seal operation and utilization, electrical resistance can be measured of the in situ seal 102, the value inserted into the historical look up table previously created for the seal 100 (or seal element 102 itself) or seal system, and a determination or calculation of seal performance or change or residual seal lifetime may be then accomplished, in a straight-forward, quick and accurate manner.

The material 106 of the invention can be or contain a host of fibers, fillers, and other molecules, or matter, that have a measurable change that correlates to a change or decay of a particular seal performance of interest. Conductive material forming material 106 need not be metallic. The material may include shapes that have various properties that change in correspondence with changing seal performance metrics. Such changes of the material properties need not be linear as compared to the seal performance criteria as long as the material changes and corresponding seal performance criteria are substantially deterministic.

Measurement of such materials 106 may include changes in the material properties such as electrical or optical resistance or conductance, change of charge for piezoelectric types of materials, change or rotation of polarization (such that may occur with stress or strain), change of magnetic characteristics—such as may occur with material being a metal particle suspension. Changes in the measured qualities of vibration or response to signals may also be included. An example of such a case would be an ultrasonic interrogation of the seal 100 (or seal element 102 itself) or seal system from the outside measuring a change in response of the seal 100 (or seal element 102 itself) or seal system, and that change correlated to the possibly changing seal performance measure. Other interrogations of the seal 100 (or seal element 102 itself) with other sensing systems are possible.

Various other methods and systems may be utilized for the detection and quantization of changes of the seal member 102 or the seal system, including but not limited to bleedout (that is, resin or other constituents that migrate to the surface of the seal member) or exfoliated matter, worn matter or debris, matter attached or adhering to the seal 102 or seal system, or even of leakage or controlled wear or disassociation of the embedded material 106 into the seal system environment, so that all such information may be correlated via known statistical methods to seal performance measurements. The "analytes" of interest in these systems may be connected with the flow of these substances or particulates passed, onto, into, or out of, the seal 100 (or the seal element 102 itself) or seal system.

Methods and systems which are capable of measuring trace amounts of matter, microorganisms, pharmaceuticals, hormones, viruses, antibodies, nucleic acids and other proteins are of great value to researchers, and may be indicators of seal performance change as well, whether shown to be permeating into, flowing passed, or being released outbound from the seal 100 (or seal element 102 itself) or sealing system.

Binding reactions, e.g., antigen-antibody reactions, nucleic acid hybridization techniques, and protein-ligand systems are further different types of measurement basis for determining seal performance in some applications. The high degree of specificity in many biochemical and biological binding systems has led to many assay methods and systems of value in research and diagnostics and these can now be utilized in seal systems as well. Typically, the existence of an analyte of interest is indicated by the presence or absence of an observable "label" attached to one or more of the binding materials. The invention, in one form, includes a label or binder device or composition, acting as the material 106 in the previous discussion. In another form of the invention, a label or binder device or composition 106 is applied to the seal 100 (or seal element 102 itself) or seal system in situ.

Of particular interest are labels which can be made to luminesce through photochemical, chemical, and electrochemical means. "Photoluminescence" is the process whereby a material is induced to luminesce when it absorbs electromagnetic radiation. Fluorescence and phosphorescence are types of photoluminescence.

"Chemiluminescent" processes entail the creation of luminescent species by chemical transfer of energy. "Electrochemiluminescence" entails creation of luminescent species electrochemically. Chemiluminescent assay techniques where a sample and in our case a surface of seal member or seal system, containing an analyte of interest is mixed with a reactant labeled with a chemiluminescent label may be utilized. The reactive mixture is incubated and some portion of the labeled reactant binds to the analyte. After incubation, the bound and unbound fractions of the mixture are separated and the concentration of the label in either or both fractions can be determined by chemiluminescent techniques. The level of chemiluminescence determined in one or both fractions indicates the amount of analyte of interest bound or associated with seal, indicating expected or immediately past or current seal performance.

Electrochemiluminescent (ECL) assay techniques are an improvement on chemiluminescent techniques. They provide a sensitive and precise measurement of the presence and concentration of an analyte of interest. In such techniques, the seal member or seal system or seal environment is exposed to a voltammetric working electrode in order to trigger luminescence. In the proper chemical environment, such electochemiluminescence is triggered by a voltage impressed on the working electrode at a particular time and in a particular manner. The light produced by the label is measured and indicates the presence or quantity of the analyte.

Figure 3:
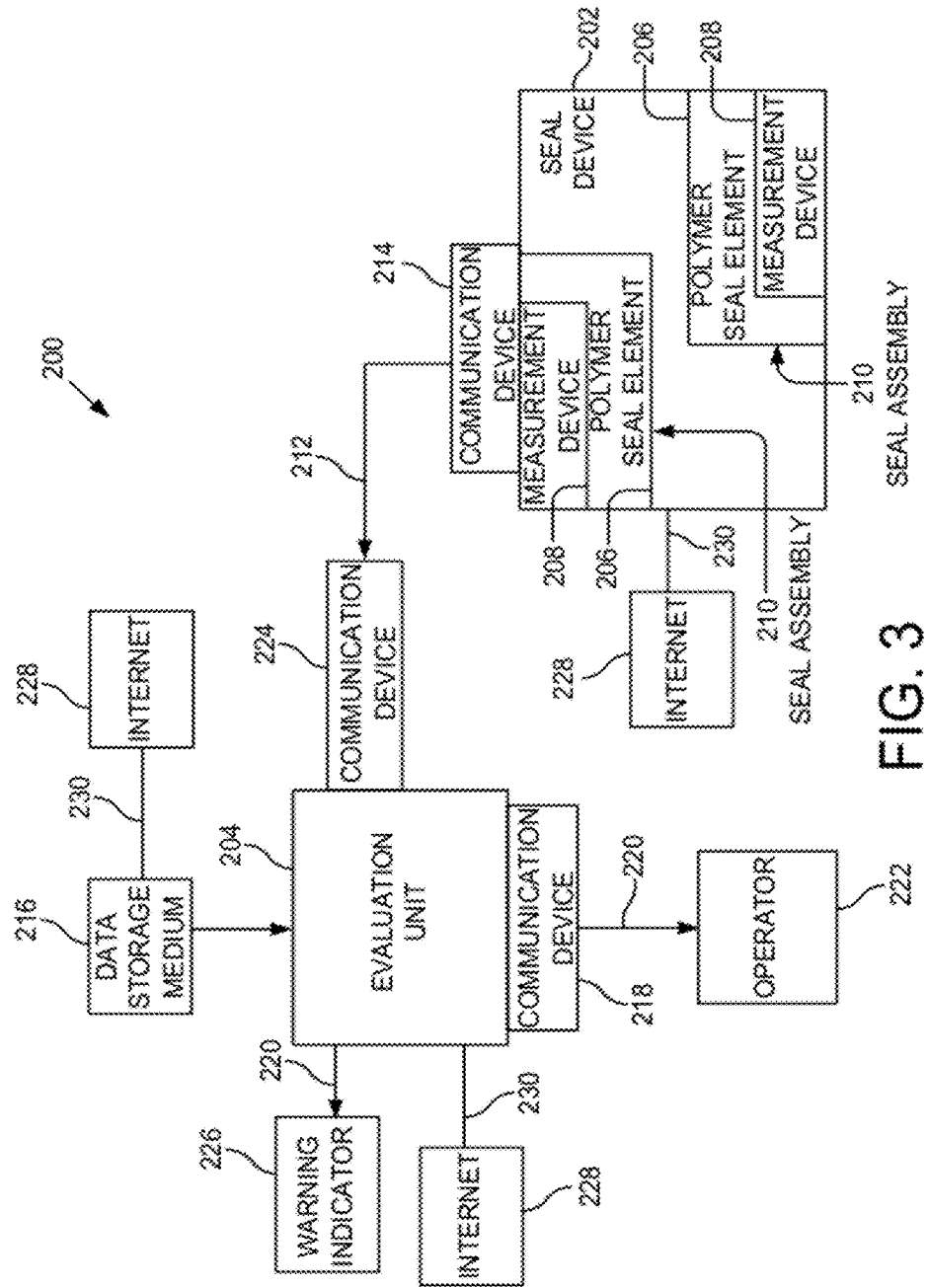
FIG. 3 is a schematic view of a seal system according to the present invention.

Referring now to FIG. 3, FIG. 3 shows a sealing system 200, according to the present invention, for sealing between two hardware members (two hardware members are not shown in FIG. 3 but are shown in FIGS. 4-7). The sealing system 200 includes a seal device 202 and an evaluation unit 204. Seal device 202 includes two seal assemblies 210 each including a polymer seal element 206 (which is disposed between the two members) and a measurement device 208. While seal device 202 is shown as having two seal assemblies 210, it is understood that seal device 202 could have only one seal assembly 210 or more than two seal assemblies 210. Further, while the seal element 206 referred to is a polymer seal element, it is understood that the polymer seal element 206 can include additional materials, such as carbon or glass, that together with the polymer form the seal element 206. The measurement device 208 (such as sensor 24 and/or material 106) is at least partially disposed within the polymer seal element 206, is configured for measuring an aspect of the polymer seal element 206 indicating sealing performance of the polymer seal element 206, and is configured for creating a signal corresponding to a measured aspect of the polymer seal element 206. The measurement device 208 can be remotely powered or self-powered. The signal from measurement device 208 can be, for example, electrical, magnetic, or radio signals or use some other form of wave. Each seal assembly 210 can further include a back-up member (not shown in FIG. 3). Thus, seal device 202 can include a plurality of polymer seal elements 206 and/or a plurality of seal assemblies 210 each including a polymer seal element 206 between the two hardware elements. Alternatively, the seal device 202 may include only one polymer seal element 206 or only one seal assembly 210 including the polymer seal element 206 between the two hardware elements. FIG. 3 shows seal device 202 including two seal assemblies 210 each including a polymer seal element 206 and a measurement device 208 at least partly disposed within the respective seal element 206.

Each of the seal assemblies 210 of the seal device 202 can include a sensor 24 (which serves as the measurement device 208 mentioned above) at least partially embedded in each of the polymer seal elements 206, like seal assembly 20 discussed above. Stated another way, the measurement device 208 can include a sensor 24 which is at least partially embedded in the polymer seal element 206. The sensor 24 includes a pressure sensor, a temperature sensor, a leakage sensor, a friction sensor, a strain sensor, a fluid film thickness sensor, a wear sensor, a deformation sensor, a vibration sensor, and/or a noise sensor. The sensor 24 measures a permanent condition and/or a temporary condition of the polymer seal element 206.

Alternatively or in addition thereto, each of the seal assemblies 210 of the seal device 202 can include a polymer seal element 206 with a continuous material composition (which serves as the measurement device 208 mentioned above), like material 106 of seal assembly 100 discussed above, for sensing decay in seal performance of the respective seal element 206. Stated another way, the measurement device 208 can include a material 106 disposed within the polymer seal element 206 and which at least in part forms the polymer seal element 206. Thus, by referring to seal element 206 as a polymer seal element 206, this does not necessarily mean that a non-polymer material is not also included in the polymer material forming, at least in part, the seal element 206. On the other hand, seal element 206 may be entirely a polymer. The material 106 changes its material properties dependent upon applied pressure, temperature, shear, strain, fretting, material loss, wear, exposure to system components, system fluid, seal absorption of said system fluid, and/or time. The material 106 effectively serves as a sensor itself. The material 106 can include a highly conductive polymer; in such an instance, the polymer seal element 206 can be entirely made of one or more polymers (for example, polymer seal element 206 can be a highly conductive polymer which serves as material 106 of seal assembly 100). According to one example of when seal element 206 includes material 106, the conductivity or resistance of the material 106 forming seal element 206 could be used to sense seal performance of seal element 206; in essence, the seal material 106 of seal element 206 would have a built-in or an inherent sensor capability as part of its inherent material properties. For example, a carbon nanontube filled material could serve as the seal material 106 (which can be in part or in whole the material of seal element 206) of seal element 206, wherein the conductivity of the seal element 206 would change inherently. Whether material 106 is in part or in whole the seal material of seal element 206, seal element 206 thus serves as a sensor itself.

The evaluation unit 204 of the seal system 200 is configured for evaluating the signal corresponding to the measured aspect of the polymer seal element 206 and for determining a sealing performance capability of the polymer seal element 206. The signals from the measurement device 208 can be transmitted to evaluation unit 204 along a transmission path 212. If seal device 202 includes more than one measurement device 208, then virtually the same transmission paths 212 or additional corresponding transmission paths 212 can be used. The transmission path 212 can be wire or wireless.

Figure 4:
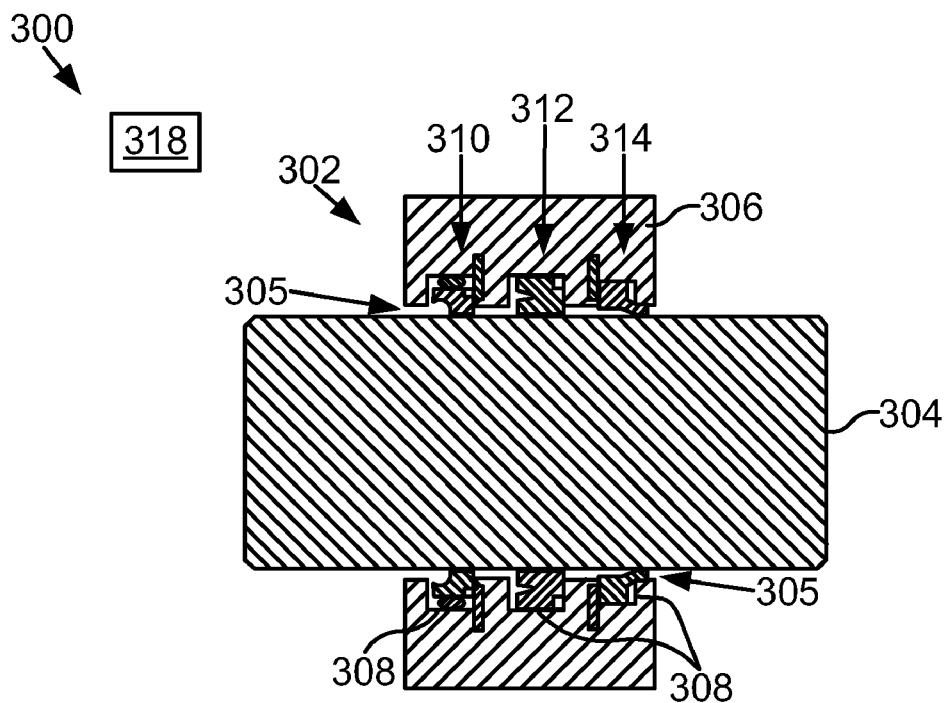
FIG. 4 is a cross-sectional view of a hardware unit with a seal device disposed therein according to another embodiment of the present invention.
Figure 5:
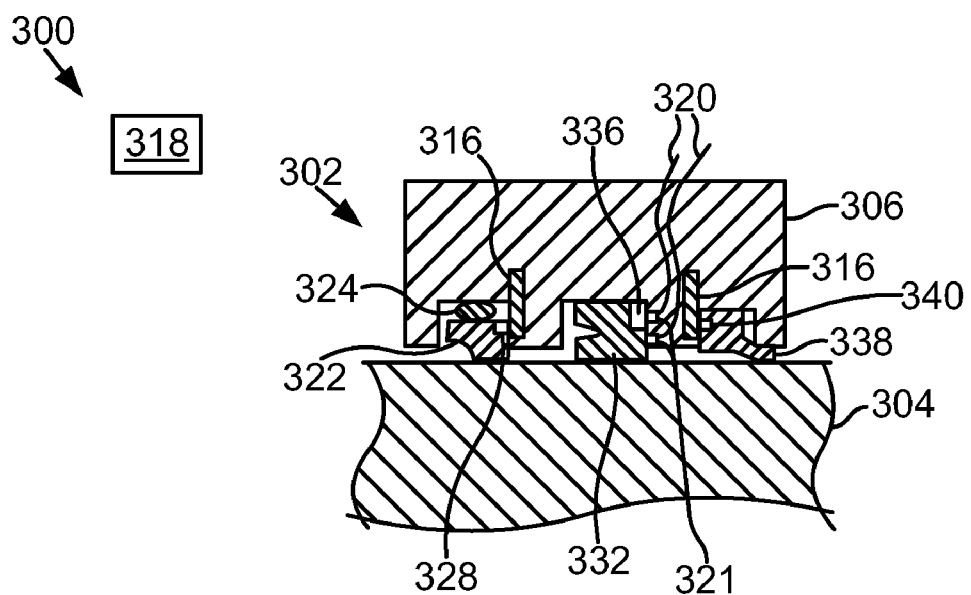
FIG. 5 is a fragmentary, cross-sectional view of the hardware unit with the seal device of FIG. 4.

Seal system 200 can further include a communication device 214 configured for communicating the signal away from the polymer seal element 206, evaluation unit 204 being configured for receiving the signal from communication device 214. Communication device 214 can be a wired or wireless connection for transmitting the signal away from the polymer seal element 206. Communication device 214 can be the collection of electrodes and wires used to transmit the signal from the measurement device 208 to evaluation unit 204 (as shown in FIGS. 4-7). Communication device 214 can be a transmitter (as shown in FIGS. 4-5). Communication device 214 can be a radio-frequency identification device which applies power to the measurement device 208.

As indicated above, seal device 202 of sealing system 200 can include a second sealing assembly 210 (as shown in FIG. 3) which includes a second polymer seal element 206 and a second measurement device 208, the second polymer seal element 206 being disposed between the two hardware members. The second measurement device 208 is at least partially disposed within the second polymer seal element 206, is configured for measuring an aspect of the second polymer seal element 206 indicating sealing performance of the second polymer seal element 206, and is configured for creating a second signal corresponding to a measured aspect of the second polymer seal element 206. The second signal is transmitted along transmission path 212. Evaluation unit 204 is configured for evaluating the second signal corresponding to the measured aspect of the second polymer seal element 206 and for determining a sealing performance capability of the second polymer seal element 206. The second measurement device 208 includes (a) a sensor 24 which is at least partially embedded in the second polymer seal element 206 (like sensor 24 of seal assembly 20), and/or (b) a material 106 which is disposed within the second polymer seal element 206 and which at least in part forms the second polymer seal element 206 (like material 106 of seal assembly 100), the material 106 changing its material properties dependent upon applied pressure, temperature, shear, strain, fretting, material loss, wear, exposure to system components, system fluid, seal absorption of said system fluid, and/or time. While the seal device 202 of FIG. 3 is essentially described as having two seal assemblies 210 (that is, a first seal assembly 210 with first seal element 206 and first measurement device 208, and a second seal assembly 210 with a second seal element 206 and a second measurement device 208), it is understood that the first seal assembly 210 (i.e., the seal element 206 and measurement device 208 in the upper left corner of seal device 202 in FIG. 3) and the second seal assembly 210 (i.e., the seal element 206 and measurement device 208 in the lower right corner of seal device 202 in FIG. 3) can both be like seal assembly 20 (having a sensor 24 embedded in the polymer seal element 206) or that the first seal assembly 210 can be like seal assembly 20 (having a sensor 24 embedded in the polymer seal element 206) and the second seal assembly 210 can be like seal assembly 100 (having a sensing material 106 at least in part forming seal element 206), or vice versa.

Sealing system 200 can further include a data storage medium 216 and another communication device 218. Evaluation unit 204 can be a processor (i.e., a central processing unit of a computer). The signals transmitted along transmission paths 212 can be deemed input signals. Processor 204 has input signals (those signals transmitted along transmission paths 212) and output signals (those transmitted along transmission paths 220 going away from processor 204). The data storage medium 216 can be, for example, a computer hard drive, a disk inserted into the computer including processor 204 which is readable by the computer, or generally a computer readable storage medium. Data storage medium 216 is operatively connected to processor 204 so that the data can be processed by processor 204. Data storage medium 216 includes performance data and/or a plurality of thresholds regarding a plurality of polymer seal elements and/or seal assemblies. Processor 204 is configured for comparing the input signals from the measurement devices 208 to the performance data and/or the plurality of thresholds to create the output signals transmitted along transmission paths 220. The performance data can be historical data of the seal device 202 which is in current use and sending data to evaluation unit 204 and/or can be historical data of other substantially identical or sufficiently similar seal devices 202. The performance data and/or the plurality of thresholds can be disposed in an Extensible Markup Language file.

Communication device 218 is configured for communicating the output signals of the processor 204 to an operator 222. The output signals to the operator 222 correspond to lifetime prediction data of the corresponding polymer seal element 206. These output signals can be transmitted to the operator 222 along a transmission path 220 via wire or wirelessly. Communication device 218 can be a transmitter or essentially be part of the computer including processor 204 which communicates data away from the computer itself via a landline. The output signal can be in the form of a feedback signal. The feedback signal to the operator 222 includes a stop signal, a reduce use signal, a reduce speed signal, a nominal signal, a sealing lifetime remaining signal, a sealing leakage signal, a sealing friction signal, a sealing system out-of-bounds signal, a maintenance required signal, and/or a sealing replacement signal.

Data storage medium 216 can have polymer sealing performance criteria stored thereon. For instance, data storage medium 216 includes file information specifying a plurality of threshold sealing signals. The plurality of threshold sealing signals can be disposed in an Extensible Markup Language file. Another communication device 224 is configured for obtaining a sealing signal from a polymer seal element 206 of seal device 202. Communication device 224 passes the obtained sealing signal from seal device 202 to processor 204. Communication device 224 can be a radio frequency identification reader for obtaining the sealing signal from the polymer seal element 206, the radio frequency identification reader passing the obtained sealing signal to the processor 204; alternatively, communication device 224 can be a hard-wired part of the computer including processor 204 which receives communications via a landline. Processor 204 compares the obtained sealing signal from seal device 202 to the plurality of threshold sealing signals and thereby computes an output signal based upon whether the obtained sealing signal is within bounds of the plurality of threshold sealing signals. As indicated above, processor 204 forms at least one output signal in the form of a stop signal, a reduce use signal, a reduce speed signal, a nominal signal, a sealing lifetime remaining signal, a sealing leakage signal, a sealing friction signal, a sealing system out-of-bounds signal, a maintenance required signal, and/or a sealing replacement signal.

Sealing system 200 can further include a warning indicator 226. Processor 204 can activate warning indicator 226 based upon the comparison the processor 204 makes with data from the data storage medium 216. This warning indicator 226 can warn an operator 222 that seal device 202 has failed or is about to fail and is thus in need of being replaced, for example.

Sealing system 200 is configured for communicating data to and/or from the internet 228. This data includes the polymer sealing performance criteria, the obtained sealing signal, the plurality of threshold sealing signals, and/or the output signal from evaluation unit 204. Three different transmission paths 230 are shown in FIG. 3. For instance, data can be transmitted to and/or from data storage medium 216 relative to the internet 228 via transmission path 230. Data can be transmitted to and/or from seal device 202 relative to the internet 228 via transmission path 230. Data can be transmitted to and/or from evaluation unit 204 relative to the internet 228 via transmission path 230.

Referring now to FIGS. 4-5, FIGS. 4-5 show cross-sectional views of seal system 300 including a seal device 302 disposed between two members 304, 306. FIG. 5 is a detail view of a portion of FIG. 4. Seal system 300 is similar to seal system 200 and is thus another embodiment of the present invention. The primary focus of FIGS. 4-5, however, is to show a seal device (device 302) in more detail as compared to FIG. 3. Seal system 300 provides sealing between the two hardware members 304, 306. More specifically, seal device 302 of seal system 300 provides sealing between members 304, 306. Hardware members 304, 306 are a first structural member 304 and a second structural member 306; members 304 and 306 form two parts of a hardware unit in which seal device 302 is disposed. First structural member 304 can be, for example, a rotary cylinder or an axially displacing rod. Second structural member 306 is situated about first structural member 304 and can define a plurality of seal grooves 308 in which corresponding polymer seal elements 322, 332, 338 of seal device 302 reside. In FIGS. 4-5, first structural member 304 is a cylinder, and second structural member 306 is a ring (a donut-shaped structure) about member 304 with a gap 305 therebetween. FIG. 4 is a cross-sectional view taken along a vertical plane slicing through top dead center and down through bottom dead center of the hardware unit formed by members 304 and 306 and seal device 302. For the sake of clarity, FIGS. 4 and 5 essentially do not show background relative to the cross-section; in other words, if background were shown, then portions of member 306 and seal device 302 would be shown essentially fading away from the viewer. Seal device 302 includes a first seal assembly 310, a second seal assembly 312, and a third seal assembly 314; each of the seal assemblies 310, 312, and 314 corresponds to seal assembly 210 above. In association with seal device 302, seal system 300 further includes two signal transmitters 316, a wireless receiver 318 (which can correspond to communication device 224 of FIG. 3), fixed electrode wires 320, and fixed electrodes 321.

First seal assembly 310 includes a first polymer seal element 322 which can be made of polymeric material (and thus correspond to polymer seal element 206 above), a buffer seal 324, and an in-seal sensor 328 (which can correspond to sensor 24 of seal assembly 20 and thus measurement device 208 above). A signal transmitter 316 is also provided to first seal assembly 310 so as to wirelessly transmit sensed data concerning seal element 322 from sensor 328 to wireless receiver 318; the data received by the wireless receiver 318 can then be provided to an evaluation unit, such as evaluation unit 204 (not shown in FIGS. 4-5).

Second seal assembly 312 includes a U-cup polymer seal element 332 which can be made of polymeric material (and thus correspond to polymer seal element 206 above) and an in-seal sensor 336 (which can correspond to sensor 24 of seal assembly 20 and thus measurement device 208 above). Fixed electrodes 321 can be connected to second structural element 306 and have fixed electrode wires 320 running therefrom to or towards an evaluation unit (such as evaluation unit 204, which is not shown in FIGS. 4-5), the fixed electrodes 321 and wires 320 serving to communicate sensed data concerning seal element 332 from sensor 336 to evaluation unit 204. While electrodes 321 are denoted as fixed electrodes, it is understood that second seal assembly 312 could instead include variable position electrodes that maintain contact with the sensor 336 even if sensor 336 moves (i.e., rotates) in the respective seal groove 308; such a variable position electrode could be formed as a ring, or a partial ring, disposed in or about second structural member 306.

Third seal assembly 314 includes a seal element 338 and an in-seal sensor 340 (which can correspond to sensor 24 of seal assembly 20 and thus measurement device 208 above). Seal element 338 can be made of polymeric material (and thus correspond to polymer seal element 206 above) and include a scraper. A signal transmitter 316 is also provided to third seal assembly 314 so as to wirelessly transmit sensed data concerning seal element 338 from sensor 340 to wireless receiver 318; the data received by the wireless receiver 318 can then be provided to an evaluation unit, such as evaluation unit 204 (not shown in FIGS. 4-5).

Figure 6:
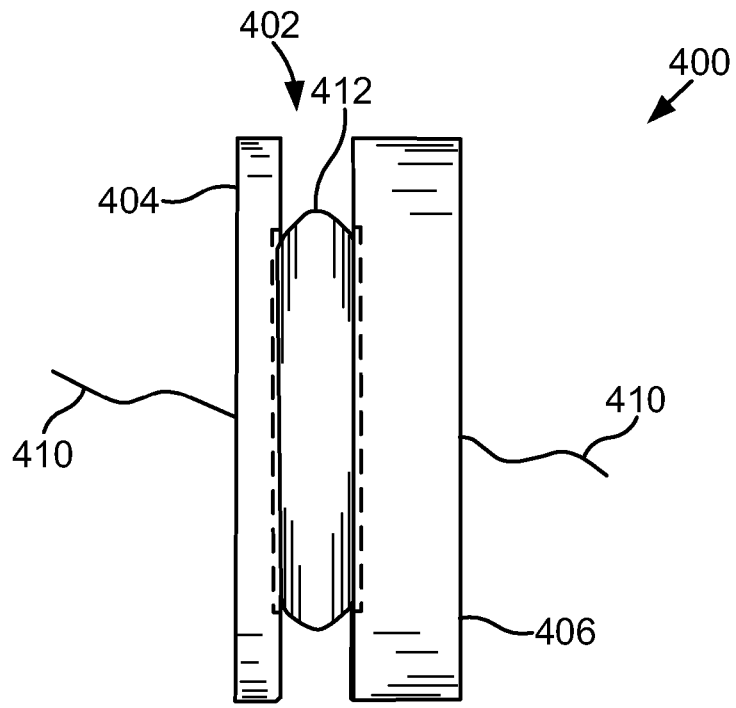
FIG. 6 is a side view of a hardware unit with a seal device disposed therein according to another embodiment of the present invention.
Figure 7:
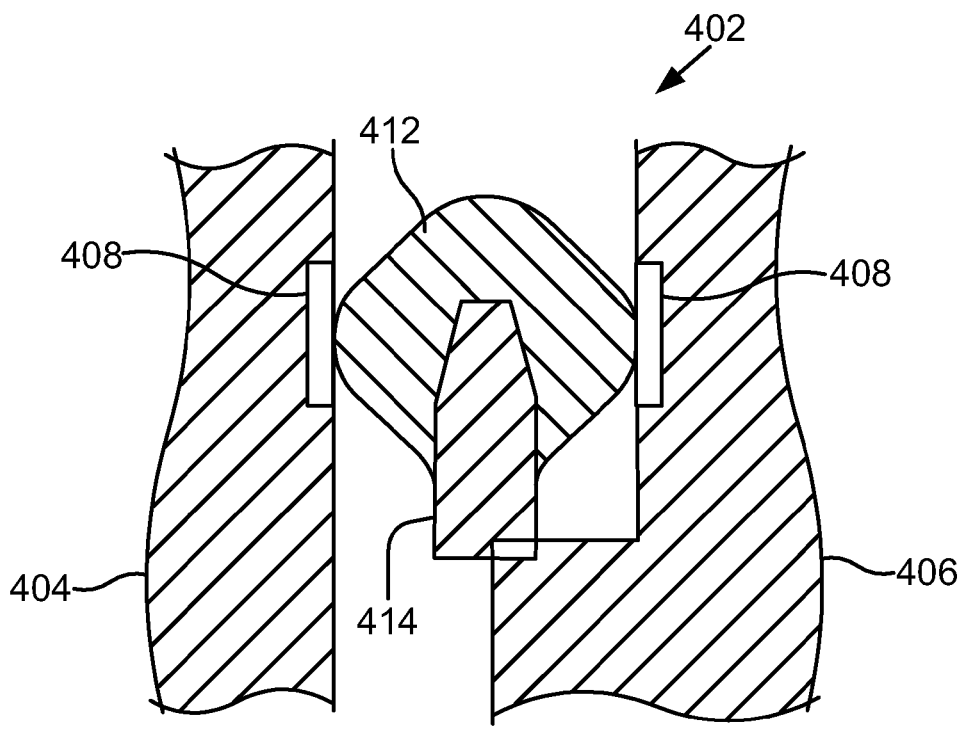
FIG. 7 is a fragmentary, cross-sectional view of the hardware unit with the seal device of FIG. 6.

Referring now to FIGS. 6-7, FIGS. 6-7 show cross-sectional views of seal system 400 including a seal device 402 disposed between two members 404, 406. FIG. 7 is a detail view of a portion of FIG. 6. Seal system 400 is similar to seal system 200 and is thus another embodiment of the present invention. The primary focus of FIGS. 6-7, however, is to show a seal device (device 402) in more detail as compared to FIG. 3. Seal system 400 provides sealing between the two hardware members 404, 406. More specifically, seal device 402 of seal system 400 provides sealing between members 404, 406. Hardware members 404, 406 are a first structural member 404 and a second structural member 406; members 404 and 406 form two parts of a hardware unit in which seal device 402 is disposed. FIG. 7 is a cross-sectional view taken along a vertical plane slicing through top dead center and down through bottom dead center of seal device 402 and the hardware unit formed by members 404 and 406; like FIGS. 4 and 5, FIG. 7 omits background detail of seal device 402. Seal device 402 is a single seal assembly 402. In association with seal device 402, seal system 400 further includes slip rings 408 and wires 410 to slip rings 408; while FIG. 7 does not show wires 410 actually contacting slip rings 408, it is understood that wires 410 are in electrical contact with slip rings 408. Seal assembly 402 includes a seal element 412 (which can be made of polymeric material and thus correspond to polymer seal element 206 above) and a back-up member 414 (which can also be referred to as a back-up ring 414). Seal assembly 402 is an axial seal. Seal element 412 includes seal material like that of material 106 of seal assembly 100 discussed above; this seal material in FIGS. 6 and 7 is the material of seal element 412 and is thus recognized as reference number 412 as well. The material of seal element 412 is thus both the seal material and a material that shows the change in performance over time electrically; stated another way, the material of seal element 412 performs both a sealing function and a sensing function. Seal element 412 thus forms a continuous sensor by virtue of the seal material of seal element 412. Slip rings 408 are used to obtain sensed data (i.e., conductivity and/or resistivity of material 412) from the seal element 412. That sensed data is then communicated from slip rings 408 via wires 410 to an evaluation unit, such as evaluation unit 204 (not shown in FIGS. 6-7).

Figure 8:
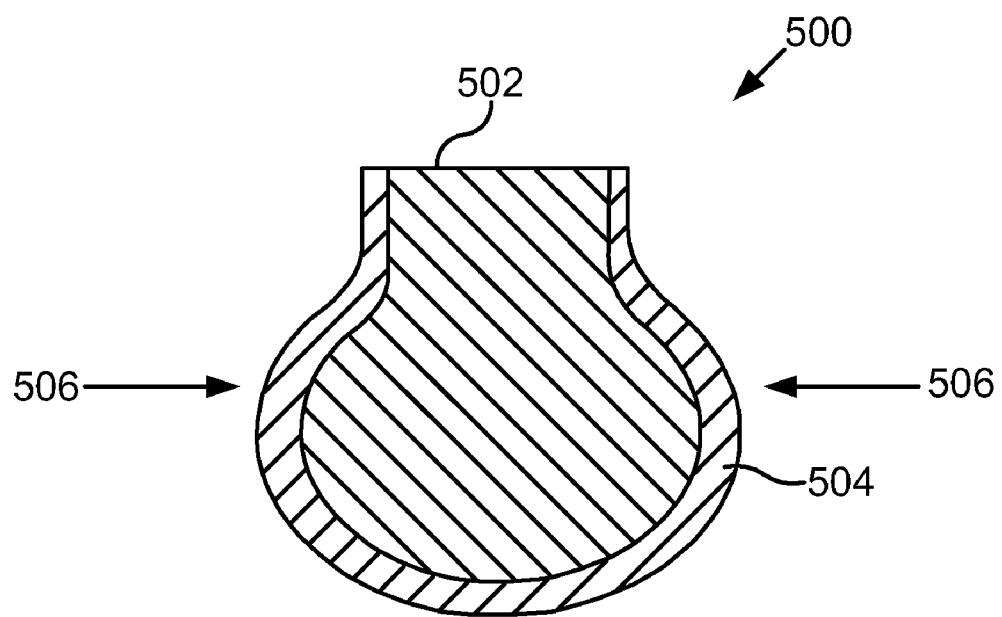
FIG. 8 is a cross-sectional view of another embodiment of a seal element according to the present invention.

Referring now to FIG. 8, FIG. 8 shows a cross-sectional view of a polymer seal element 500, which is another embodiment of the polymer seal element according to the present invention. Polymer seal element 500 corresponds to polymer seal element 206 above. Seal element 500 includes an elastomer core 502 (such as a rubber elastomer) and a polymer covering 504 over elastomer core 502. Elastomer 504 provides energy to seal element 500, and polymer covering 504 provides seal element 500 with heat and chemical resistance during an application of seal element 500. Seal element 500 can be compressed axially with a compressive force (as shown by arrows 506) when seal element 500 is seated in two hardware elements (not shown). Either one of elastomer 502 or polymer covering 504, or both elastomer 502 or polymer 504, could serve as the continuous sensor material 106, as described above relative to the continuous material composition 106 of seal assembly 100.

Figure 9:
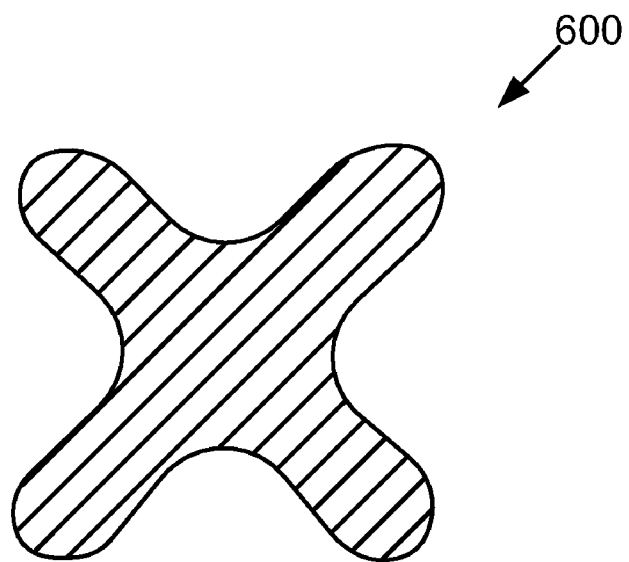
FIG. 9 is a cross-sectional view of another embodiment of a seal element according to the present invention.

Referring now to FIG. 9, FIG. 9 shows a cross-sectional view of a polymer seal element 600, which is another embodiment of the polymer seal element according to the present invention. Polymer seal element 600 corresponds to polymer seal element 206 above. Seal element 600 shows a compression element having an X-shape. Seal element 600 can have a continuous material composition 106 of seal assembly 100 as described above and thus serve as the continuous sensor material 106.

The present invention further provides a method for sealing between two members (shown in FIGS. 4-7). The method includes the following steps: providing a polymer seal 206 at least partially disposed between the two members; measuring an aspect of the polymer seal 206 indicating sealing performance of the polymer seal 206; creating a signal corresponding to a measured aspect of the polymer seal 206; evaluating the signal corresponding to the measured aspect of the polymer seal 206; and determining a sealing performance capability of the polymer seal 206. The step of measuring can be carried out at least in part by a sensor (24, 208, 328, 336, 340) disposed within the polymer seal 206, the sensor including a pressure sensor, a temperature sensor, a leakage sensor, a friction sensor, a strain sensor, a fluid film thickness sensor, a wear sensor, a deformation sensor, a vibration sensor, and/or a noise sensor. The step of measuring can be carried out at least in part by a material (106, 412, 500, 600) which is disposed within the polymer seal 206 and which at least in part forms the polymer seal 206, the material (106, 412, 500, 600) changing its material properties dependent upon applied pressure, temperature, shear, strain, fretting, material loss, wear, exposure to system components, system fluid, seal absorption of said system fluid, and/or time.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing system for sealing between two members, said sealing system comprising:
   a first polymer seal disposed between the two members;
   a first measurement device which is at least partially disposed within said first polymer seal, is configured for measuring an aspect of said first polymer seal indicating sealing performance of said first polymer seal, and is configured for creating a first signal corresponding to a measured said aspect of said first polymer seal;
   a second polymer seal disposed between the two members;
   a second measurement device which is at least partially disposed within said second polymer seal, is configured for measuring an aspect of said second polymer seal indicating sealing performance of said second polymer seal, and is configured for creating a second signal corresponding to a measured said aspect of said second polymer seal, said second measurement device including one of (a) a sensor which is at least partially embedded in said second polymer seal and (b) a material disposed within said second polymer seal and at least in part forming said second polymer seal, said material of said second measurement device changing its material properties dependent upon at least one of an applied pressure, a temperature, a shear, a strain, a fretting, a material loss, a wear, an exposure to system components, a system fluid, a seal absorption of said system fluid, and a time; and an evaluation unit configured for evaluating said first signal corresponding to said measured aspect of said first polymer seal and for determining a sealing performance capability of said first polymer seal dependent on at least one of performance data and a plurality of thresholds regarding a plurality of at least one of polymer seals and seal assemblies, said evaluation unit being configured for evaluating said second signal corresponding to said measured aspect of said second polymer seal and for determining a sealing performance capability of said second polymer seal.

2. The sealing system of claim 1, wherein said first measurement device includes a sensor which is at least partially embedded in said first polymer seal.

3. The sealing system of claim 2, wherein said sensor of said first measurement device includes at least one of a pressure sensor, a temperature sensor, a leakage sensor, a friction sensor, a strain sensor, a fluid film thickness sensor, a wear sensor, a deformation sensor, a vibration sensor, and a noise sensor.

4. The sealing system of claim 2, wherein said sensor of said first measurement device measures at least one of a permanent condition and a temporary condition of said first polymer seal.

5. The sealing system of claim 1, wherein said first measurement device includes a material disposed within said first polymer seal and at least in part forming said first polymer seal, said material of said first measurement device changing its material properties dependent upon at least one of an applied pressure, a temperature, a shear, a strain, a fretting, a material loss, a wear, an exposure to said system components, said system fluid, a seal absorption of said system fluid, and a time.

6. The sealing system of claim 5, wherein said material of said first measurement device includes a highly conductive polymer.

7. The sealing system of claim 1, wherein said first measurement device is one of remotely powered and self-powered.

8. The sealing system of claim 1, wherein said first signal is one of electrical and magnetic.

9. The sealing system of claim 1, further including a communication device configured for communicating said first signal away from said first polymer seal, said evaluation unit configured for receiving said first signal from said communication device.

10. The sealing system of claim 9, wherein said communication device is one of a wired and a wireless connection for transmitting said first signal away from said first polymer seal.

11. The sealing system of claim 9, wherein said first communication device is a radio-frequency identification device which applies power to said first measurement device.

12. The sealing system of claim 1, further including a data storage medium and a communication device, said evaluation unit being a processor, said first signal being an input signal, said processor having said input signal and an output signal, said data storage medium operatively connected to said processor, said data storage medium including at least one of said performance data and said plurality of thresholds regarding said plurality of at least one of polymer seals and seal assemblies, said processor configured for comparing at least one said input signal to at least one of said performance data and said plurality of thresholds to create said output signal, said communication device configured for communicating said output signal to an operator.

13. The sealing system of claim 12, wherein said output signal is in the form of a feedback signal.

14. The sealing system of claim 13, wherein said feedback signal to said operator includes at least one of a stop signal, a reduce use signal, a reduce speed signal, a nominal signal, a sealing lifetime remaining signal, a sealing leakage signal, a sealing friction signal, a sealing system out-of-bounds signal, a maintenance required signal, and a sealing replacement signal.

15. The sealing system of claim 12, wherein said performance data is historical, said output signal corresponding to lifetime prediction data of said first polymer seal.

16. The sealing system of claim 1, further including a data storage medium and a communication device, said evaluation unit being a processor which is in operative communication with said data storage medium, said data storage medium having a polymer sealing performance criteria stored thereon, said first signal being a sealing signal, said communication device configured for obtaining said sealing signal from said first polymer seal, said communication device configured for passing an obtained said sealing signal to said processor, said data storage medium including file information specifying a plurality of threshold sealing signals, said processor configured for comparing said obtained sealing signal to said plurality of threshold sealing signals and thereby for computing an output signal based upon whether said obtained sealing signal is within bounds of said plurality of threshold sealing signals.

17. The sealing system of claim 16, wherein said processor forms at least one output signal as at least one of a stop signal, a reduce use signal, a reduce speed signal, a nominal signal, a sealing lifetime remaining signal, a sealing leakage signal, a sealing friction signal, a sealing system out-of-bounds signal, a maintenance required signal, and sealing replacement signal.

18. The sealing system of claim 16, further comprising a warning indicator, said processor activating said warning indicator.

19. The sealing system of claim 16, wherein the sealing system is configured for at least one of communicating data to and from an internet, said data including at least one of said polymer sealing performance criteria, said obtained sealing signal, said plurality of threshold sealing signals, and said output signal.

20. A method of sealing between two members, said method comprising the steps of:
providing a sealing system for sealing between the two members, the sealing system including:
a first polymer seal at least partially disposed between the two members;
a first measurement device which is at least partially disposed within said first polymer seal, is configured for measuring an aspect of said first polymer seal indicating sealing performance of said first polymer seal, and is configured for creating a first signal corresponding to a measured said aspect of said first polymer seal;

a second polymer seal disposed between the two members;

a second measurement device which is at least partially disposed within said second polymer seal, is configured for measuring an aspect of said second polymer seal indicating sealing performance of said second polymer seal, and is configured for creating a second signal corresponding to a measured said aspect of said second polymer seal, said second measurement device including one of (a) a sensor which is at least partially embedded in said second polymer seal and (b) a material disposed within said second polymer seal and at least in part forming said second polymer seal, said material of said second measurement device changing its material properties dependent upon at least one of an applied pressure, a temperature, a shear, a strain, a fretting, a material loss, a wear, an exposure to system components, a system fluid, a seal absorption of said system fluid, and a time; and an evaluation unit configured for evaluating said first signal corresponding to said measured aspect of said first polymer seal and for determining a sealing performance capability of said first polymer seal dependent on at least one of performance data and a plurality of thresholds regarding a plurality of at least one of polymer seals and seal assemblies, said evaluation unit being configured for evaluating said second signal corresponding to said measured aspect of said second polymer seal and for determining a sealing performance capability of said second polymer seal;

measuring said aspect of said first polymer seal indicating said sealing performance of said first polymer seal;

creating said first signal corresponding to said measured aspect of said first polymer seal;

evaluating said first signal corresponding to said measured aspect of said first polymer seal;

determining said sealing performance capability of said first polymer seal dependent on at least one of said performance data and said plurality of thresholds regarding said plurality of at least one of polymer seals and seal assemblies;

measuring said aspect of said second polymer seal indicating said sealing performance of said second polymer seal;

creating said second signal corresponding to said measured aspect of said second polymer seal;

evaluating said second signal corresponding to said measured aspect of said second polymer seal; and determining said sealing performance capability of said second polymer seal dependent on at least one of said performance data and said plurality of thresholds regarding said plurality of at least one of polymer seals and seal assemblies.

21. The method of sealing of claim 20, wherein said first measurement device includes a sensor disposed within said first polymer seal, said step of measuring said aspect of said first polymer seal being carried out at least in part by said sensor disposed within said first polymer seal, said sensor of said first measurement device including at least one of a pressure sensor, a temperature sensor, a leakage sensor, a friction sensor, a strain sensor, a fluid film thickness sensor, a wear sensor, a deformation sensor, a vibration sensor, and a noise sensor.

22. The method of sealing of claim 20, wherein said first measurement device includes a material disposed within said first polymer seal and at least in part forming said first polymer seal, said step of measuring said aspect of said first polymer seal being carried out at least in part by said material disposed within said first polymer seal and at least in part forming said first polymer seal, said material of said first measurement device changing its material properties dependent upon at least one of an applied pressure, a temperature, a shear, a strain, a fretting, a material loss, a wear, an exposure to said system components, said system fluid, a seal absorption of said system fluid, and a time.

* * * * *